United States Patent [19]

Bénéteau

[11] Patent Number: 4,590,638
[45] Date of Patent: May 27, 1986

[54] WIPER BLADE WITH AIR DEFLECTING DEVICE

[75] Inventor: Christian Bénéteau, Gorcy, France

[73] Assignee: Champion Spark Plug Europe S.A., Virton, Belgium

[21] Appl. No.: 648,302

[22] Filed: Sep. 7, 1984

[30] Foreign Application Priority Data

Sep. 28, 1983 [FR] France .................. 83 15421

[51] Int. Cl.⁴ .................. B60S 1/04; B60S 1/38
[52] U.S. Cl. .................. 15/250.42; 15/250.36
[58] Field of Search .................. 15/250.32–250.42

[56] References Cited

U.S. PATENT DOCUMENTS

| D. 268,020 | 2/1983 | Duvoux . | |
|---|---|---|---|
| 2,775,780 | 1/1957 | Pisano | 15/250.41 X |
| 2,834,976 | 5/1958 | Oishei | 15/250.4 |
| 3,874,019 | 4/1975 | Speth . | |

FOREIGN PATENT DOCUMENTS

| 2346100 | 4/1975 | Fed. Rep. of Germany . |
|---|---|---|
| 2619633 | 11/1977 | Fed. Rep. of Germany . |
| 2639147 | 3/1978 | Fed. Rep. of Germany . |
| 83081429 | 1/1984 | Fed. Rep. of Germany . |
| 1428310 | 1/1966 | France . |
| 2267911 | 4/1974 | France . |
| 2490565 | 9/1980 | France . |
| 2513952 | 10/1981 | France . |
| 2513953 | 10/1982 | France . |
| 925659 | 5/1963 | United Kingdom . |
| 1030044 | 5/1966 | United Kingdom . |
| 1048932 | 11/1966 | United Kingdom . |
| 1052276 | 12/1966 | United Kingdom . |
| 2106775 | 10/1981 | United Kingdom . |

Primary Examiner—Peter Feldman
Attorney, Agent, or Firm—Wood, Dalton, Phillips, Mason & Rowe

[57] ABSTRACT

A wiper blade is provided and has a wiping element, a superstructure having at least two articulated elements and an air deflecting device secured to at least one of the elements by resilient members. Stops, runners or abutments are carried by the lower edge of the air deflecting device to hold the lower edge of the air deflecting device spaced from the surface to be wiped by a limited but defined amount. The resilient members hold the air deflecting device and, in particular, the stops, runners or abutments on the air deflecting device resiliently against the surface to be wiped as the blade is reciprocated across said surface.

14 Claims, 14 Drawing Figures

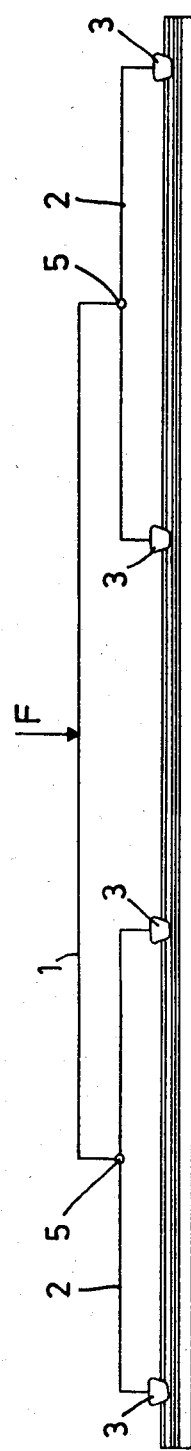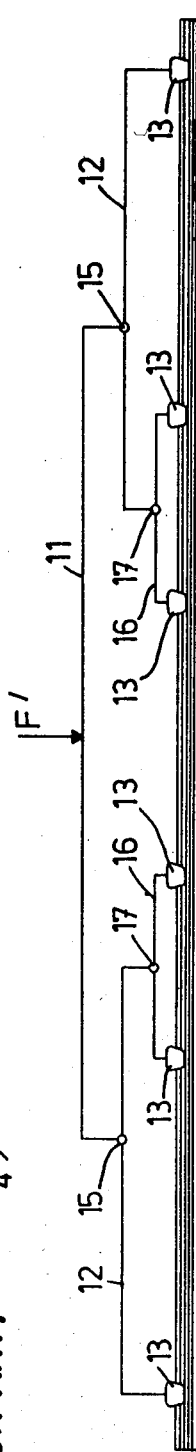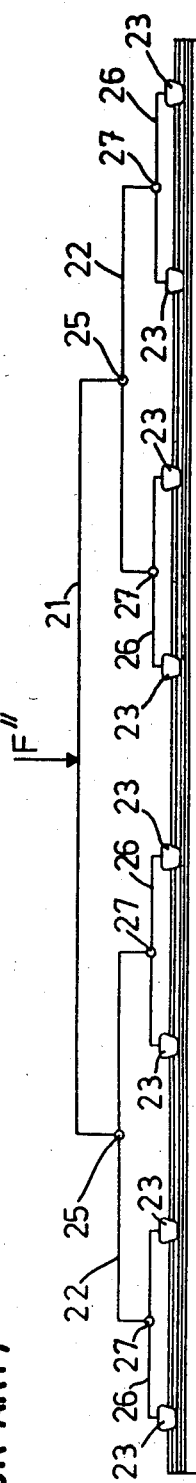
FIG. 1 (PRIOR ART)
FIG. 2 (PRIOR ART)
FIG. 3 (PRIOR ART)

WIPER BLADE WITH AIR DEFLECTING DEVICE

DESCRIPTION

1. Technical Field

The present invention relates to a wiper blade used, for example, for cleaning the windshields of motor vehicles, comprising a wiping element, a superstructure provided with a plurality of articulated yokes and one or more air deflecting devices resiliently supported by at least one yoke of the superstructure.

2. Background of the Invention

Air deflecting devices attached to one or the other yoke of a wiper blade are well known in prior art. By way of example, French Pat. No. 1,428,310 may be mentioned. In this patent the air deflecting device extends above the superstructure of the wiper blade and, cross-section-wise, is directed upwardly. Another air deflecting device is disclosed in French Patent Publication No. 2,513,953. In this case the air deflecting device is attached to the main yoke of the superstructure of the wiper blade and, cross-section-wise, is directed downwardly.

The fact that in the first case the air deflecting device is directed upwardly and that in the second case the air deflecting device is directed downwardly seems already to indicate that the problem to be solved by means of the air deflecting devices has not yet found its final solution, i.e. the most efficient solution.

The problem to be solved is the following: when the wiper blades are working on the windshield of a motor vehicle and when said vehicle moves at a relatively high speed, the wiper blades have a tendency to lift, i.e. to move away from the windshield, under the action of the air which is flowing on the windshield, thus rendering the visibility worse and worse as the speed of the vehicle increases.

Tests on vehicles placed in a wind tunnel have shown that, in order to guarantee a maximum efficiency of the air deflecting devices, the following conditions must be complied with:

The air deflecting device must extend parallel to and at a non-negligible distance from the wiping element;

The air must be able to circulate between the air deflecting device and the assembly superstructure/wiping element of the wiper blade; and The ratio between (a) the distance between the air deflecting device and the wiping element and (b) the distance between the lower edge of the air deflecting device and the surface to be wiped must be substantially equal to ten.

Neither in French Pat. No. 1,428,310, nor in French Patent Publication No. 2,513,953 is there disclosed a wiper blade provided with an air deflecting device which complies with all conditions for obtaining the best results and consequently the embodiments described in said documents do not completely solve the problem.

SUMMARY OF THE INVENTION

As compared to the wiper blades provided with an air deflecting device according to the prior art, the wiper blades according to the invention are substantially characterized by the fact that the air deflecting device or devices are secured to one or to several of the elements of the wiper blade by resilient means.

A second characteristic is the fact that said resilient means are pre-stressed towards the surface to be wiped and a third characteristic is the fact that the lower edge of the air deflecting device or devices is provided with at least two stops, runners or abutments made of an elastic material.

Other characteristics of the invention will be better understood when reading the following portions of the description of several embodiments in conjunction with the appended drawings.

DESCRIPTION OF THE DRAWINGS

FIGS. 1 through 3 schematically show different types of known wiper blades;

DESCRIPTION OF THE PREFERRED EMBODIMENTS

Figure 4:
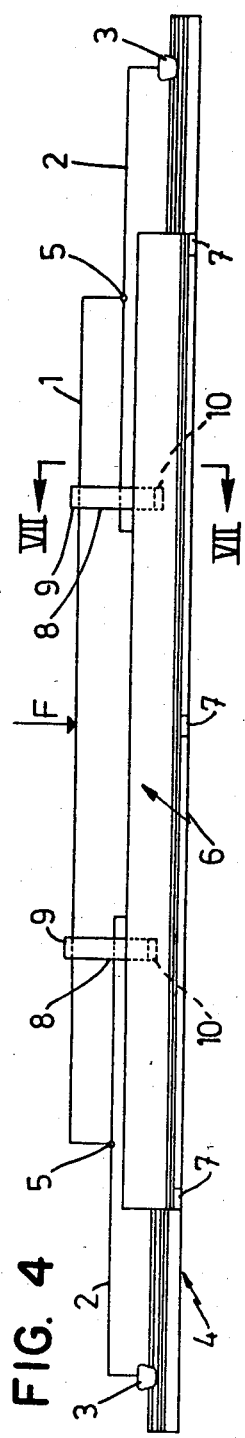
FIGS. 4 through 6 schematically show the same types of wiper blades as FIGS. 1 through 3, but provided with one or more air deflecting devices according to the invention.
Figure 7:
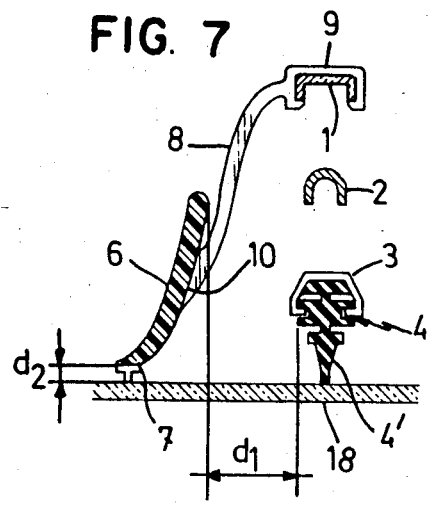
FIG. 7 is a schematical section along line VII—VII of FIG. 4, showing a first embodiment of the invention.

FIGS. 1, 4 and 7 all relate to a first type of wiper blade, i.e. the wiper blade schematically shown on FIG. 1. This wiper blade essentially comprises: the yokes 1 and 2, the claws 3 and the wiping element 4. The yokes 2 (secondary yokes) are secured to the extremities of the yoke 1 (main bridge) via the articulations 5. The claws 3 link the wiping element 4 to the yokes 2. The wiper arm (not shown) of the wiper blade of FIG. 1 acts with a force F on the yoke 1, substantially in its central portion.

FIG. 4 shows the same type of wiper blade as the one of FIG. 1, onto which an air deflecting device 6 has been mounted. The air deflecting device has a slight curve in a transverse section, the convex side of the curve being directed toward the wiper blade. This figure schematically shows that the air deflecting device 6 is secured to the yoke 1 by means of the strips or blades 8 and that its lower edge is provided with three stops, or runners or abutments 7.

It is to be noted that instead of mounting one air deflecting device onto the yoke 1, one could have mounted an air deflecting device onto each of the two yokes 2. In this case the two air deflecting devices would extend up to the central portion of the wiper blade.

FIG. 7 shows that the air deflecting device 6 is secured to the yoke 1 by means of the strips or blades 8 which are linked at 10 to the air deflecting device and which, at their upper extremities, are provided with resilient claws 9 capable of snapping onto the yoke 1.

Figure 5:
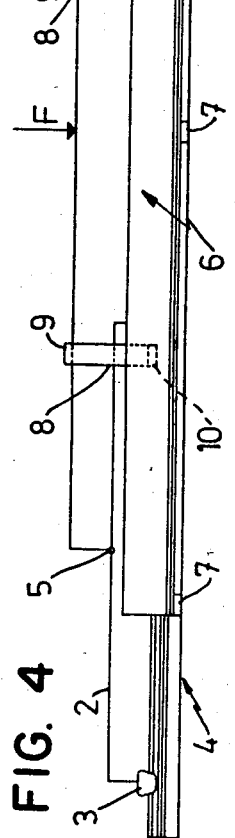
Figure 8:
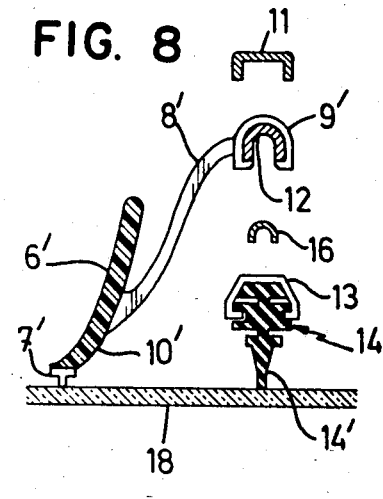
FIG. 8 is a schematical section along line VIII—VIII of FIG. 5, showing a second embodiment of the invention.

FIGS. 2, 5 and 8 all relate to a second type of wiper blade, i.e. to the type of wiper blade shown on FIG. 2. This wiper blade substantially comprises: the yokes 11, 12 and 16, the claws 13 and the wiping element 14. The yokes 16 (secondary yokes) are secured to one of the extremities of the yokes 12 via the articulations 17 and the yokes 12 (intermediate yokes) are secured to the extremities of the yoke 11 (main bridge) via the articulations 15. The wiper arm (not shown) of the wiper blade of FIG. 2 acts with a force F' on the yoke 11, substantially in its central portion.

FIG. 5 shows the same type of wiper blade than the one of FIG. 2, onto which two air deflecting devices 6' have been mounted. This figure schematically shows that the air deflecting devices 6' are secured to the yokes 12 by means of the strips or blades 8' and that their respective lower edges are provided with three stops, runners or abutments 7'.

Just as before, one could have mounted either one air deflecting device onto the yoke 11 (main bridge) or one air deflecting device onto each of the two yokes 16 (secondary yokes) of the wiper blade of FiG. 2.

FIG. 8 shows that the air deflecting devices 6' are secured to the yokes 12 by means of the strips or blades 8' which are linked at 10' to the air deflecting devices and which, at their upper extremities, are provided with resilient claws 9' capable of snapping onto the yokes 12.

Figure 6:
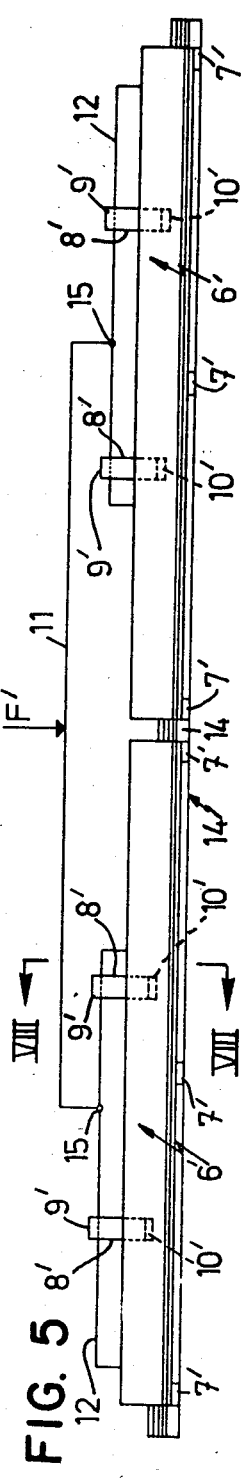
Figure 9:
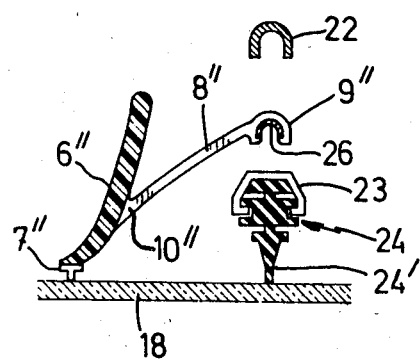
FIG. 9 is a schematical section along line IX—IX of FIG. 6, showing a third embodiment of the invention.

FIGS. 3, 6 and 9 all relate to a third type of wiper blade, i.e. to the wiper blade shown on FIG. 3. This wiper blade substantially comprises: the yokes 21, 22 and 26, the claws 23 and the wiping element 24. The yokes 26 (secondary yokes) are secured to the extremities of the yokes 22 via the articulations 27 and the yokes 22 (intermediate bridges) are secured to the extremities of the yoke 21 (main bridge) via the articulations 25. The wiper arm (not shown) of the wiper blade of FIG. 3 acts with a force F" on the yoke 21, substantially in its central portion.

FIG. 6 schematically shows that four air deflecting devices 6" have been mounted on the wiper blade of FIG. 3. Said four air deflecting devices 6" are respectively secured onto the four yokes 26 by means of the strips or blades 8", and their respective lower edges are provided with two stops, runners or abutments 7".

Here again one could as well have mounted either one air deflecting device onto the yoke 21 (main bridge) or one air deflecting device onto each of the two yokes 22 (intermediate bridges) of the wiper blade of FIG. 3.

FIG. 9 shows that the air deflecting devices 6" are secured to the yokes 26 by means of the strips or blades 8" which are linked at 10" to the air deflecting devices and which, at their upper extremities, are provided with resilient claws 9" capable of snapping onto the yokes 26.

In FIGS. 7, 8 and 9 the stops, runners or abutments 7, 7', 7" have a T-shaped cross-section of which the horizontal bar is attached to their respective lower edges of the air deflecting devices 6, 6', 6". It is to be noted that two variants are possible. In the first variant the two bars of the T extend only over the width of each stop, runner or abutment 7, 7', 7". This variant is shown in FIGS. 7, 8 and 9. In the second variant the horizontal bar of the T extends all along the lower edge of each air deflecting device 6, 6', 6", while the vertical bar of the T only extends over the width of each stop, runner or abutment 7, 7', 7". This variant is shown in FIGS. 4, 5 and 6.

Figure 10:
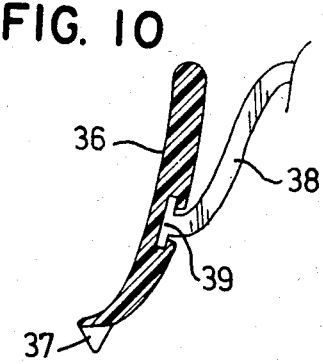
FIGS. 10 and 11 show two variants of the three embodiments of FIGS. 7, 8 and 9.
Figure 11:
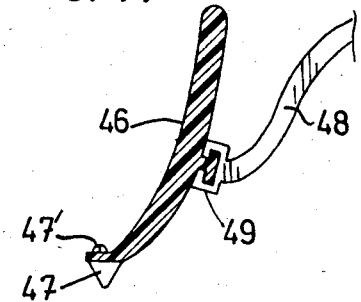

FIG. 10 shows a third variant for the stops, runners or abutments of the air deflecting device: the stop, runner or abutment 37 has the form of a triangle of which one of the sides is attached (i.e. glued) to the lower edge of the air deflecting device 36. The same shape of the stop, i.e. a triangle 47 is shown in Fig. 11. In this case the stop 47 is attached to the lower edge of the air deflecting device 46 in snapping the portion 47' of the stop 47 into a corresponding opening provided in the lower portion of the air deflecting device 46.

In the embodiments of FIGS. 7, 8 and 9 the air deflecting devices 6, 6', 6", the strips or blades 8, 8', 8" and the claws 9, 9', 9" are each time respectively made in one piece, for example, in an appropriate plastic material. A two-piece embodiment can, however, also be taken into consideration, i.e. the air deflecting devices 36,46 on one side and the strips or blades 38,48 with the corresponding claws on the other side. FIGS. 10 and 11 thus show two connecting devices between the air deflecting devices 36,46 and the strips or blades 38,48 connecting devices which are well known in prior art and which, therefore, do not need to be described in detail.

Concerning FIGS. 4 through 11, the following remarks should be noted.

The transverse section of all the yokes (1,12, 26, etc.) does not necessarily need to be the one shown in FIGS. 7 through 9;

All yokes (1,12,26, etc.) may either be made of steel or of an appropriate plastic material.

As already said above, the strips or blades 8, 8', 8" are resilient and pre-stressed towards the surface to be wiped 18.

The resilient claws 9, 9', 9" may be replaced by any other equivalent connecting devices.

Figure 12:
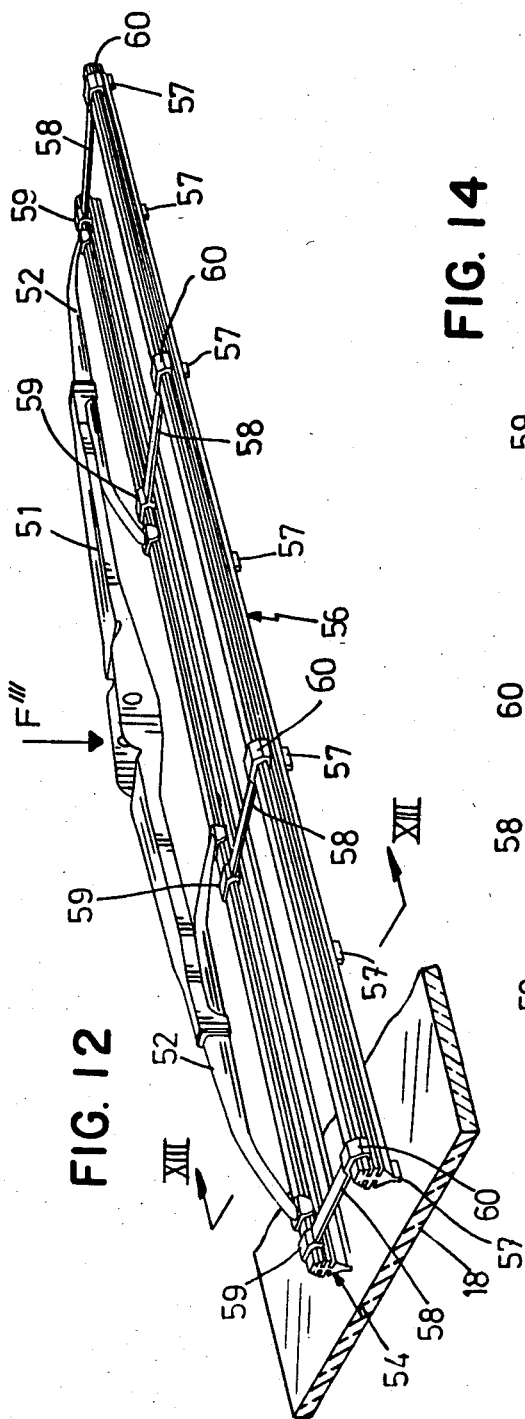
FIG. 12 is a perspective view of a fourth embodiment of the invention.
Figure 14:
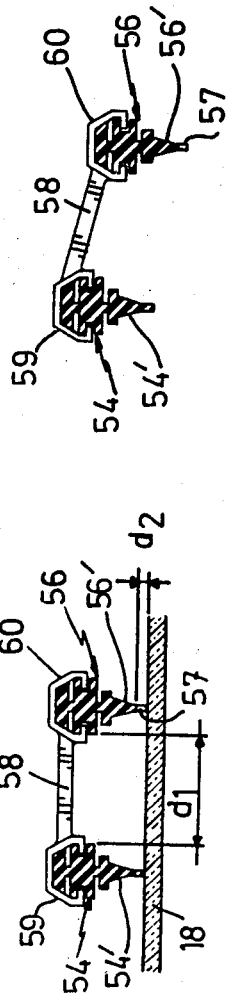
FIG. 14 is a section similar to the one of FIG. 13, but wherein the wiper blade is free of any constraint.
Figure 13:
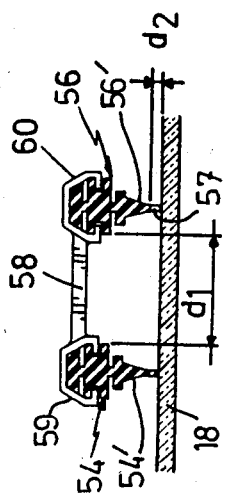
FIG. 13 is a partial section along line XIII—XIII of FIG. 12.

In the fourth embodiment of the invention shown in FIGS. 12, 13 and 14, the air deflecting devices of the three first embodiments, i.e. the air deflecting devices which have the configuration of a blade having a curved transverse section, have been replaced by the conventional wiping element 56 of which the lower lip 56' has been cut off longitudinally so as to keep only a plurality of stops, runners or abutments 57 which, because of the resilient, pre-stressed strips or blades 58, rest on the surface to be wiped 18 when the wiper arm (not shown) of the wiper blade acts with a force F''' on the yoke 51 (main bridge) of said wiper blade.

The wiper blade shown on FIG. 12 comprises only the three yokes 51,52, but it is quite evident that it could comprise a larger number of yokes. The resilient blades 58 are secured to the wiping element 54 of the wiper blade by the claws 59 and they are secured to the air deflecting wiping element 56 by the claws 60.

FIG. 14 shows (partially) the wiper blade of FIG. 12 when said wiper blade is free of any constraint, i.e. when the two wiping elements 54,56 do not rest on the surface to be wiped 18 under the action of the wiper arm (not shown). This figure is also representative for the three other embodiments of the invention (FIGS. 7,8, 9) as to the relative position of the air deflecting device 6, 6', 6" with respect to the wiping element 4,14,24 when there is no constraint on the wiper blade.

The basic principle of the four embodiments of the invention is thus as follows: when the wiper arm and the wiper blade are being placed onto the surface to be wiped 18 the air deflecting devices 6, 6', 6", 56 touch first said surface 18 by means of the respective stops, runners or abutments 7, 7', 7", 57. When releasing the wiper arm/blade, the resilient blades 8, 8', 8", 8''', 58 are being stressed under the action of the force F, F', F", F''' exerted by the wiper arm on the wiper blade and lower lips 4', 14', 24', 54' of the wiping elements 4, 14, 24, 54 touch in turn the surface to be wiped 18. The wiper blade according to the invention is now ready to be actuated. Indeed not only the lower lips 4', 14', 24', 54' of the wiping elements 4, 14, 24, 54, but also the stops, runners or abutments 7, 7', 7", 57 of the air deflecting devices 6, 6', 6", 56 are biased on the surface to be wiped 18 by the wiper arm of the wiper blade.

On the figures it can be seen that the two first conditions for obtaining a maximum efficiency of the air deflecting devices 6, 6', 6", 56 are met with, since they all extend parallel to and at a certain distance of the respective wiping elements 4,14,24,54 and since the air can circulate between the air deflecting devices and the corresponding assemblies superstructure/wiping element of the wiper blade. The third condition is met with if, (for example FIGS. 7 and 13), the ratio between the distance d1 and the distance d2 is substantially equal to ten.

Four embodiments of a new invention have thus been described, but it is quite evident that the invention is not limited to these embodiments. Indeed modifications and/or changes may be made without departing from the scope of the invention such as defined in the appended claims.

I claim:

1. A wiper blade comprising a wiping element, at least one air deflecting device and a superstructure provided with a plurality of yokes characterized in that means are provided to secure the air deflecting device to at least one of the superstructure and wiping element of the wiper blade, said means comprising a resilient material and thereby permitting multi-dimensional movement of the deflecting device relative to the superstructure to facilitate conforming of the deflecting device to a surface to be wiped by the wiper blade, and said deflecting device has two spaced abutments at its lowermost extension, which abutments guide the deflecting device over a surface to be wiped.

2. A wiper blade according to claim 1, characterized in that said resilient means is pre-stressed towards the surface to be wiped.

3. A wiper blade according to claim 1, characterized in that said resilient means is a relatively narrow, flat blade.

4. A wiper blade according to claim 3, characterized in that said resilient means is secured to at least one of the superstructure and wiping element of the wiper blade by resilient claws.

5. A wiper blade according to claim 4, characterized in that the air deflecting device, the resilient means and the resilient claws are made in one piece.

6. A wiper blade according to claim 1, characterized in that the air deflecting device has the form of an elongate blade of which the transverse section is slightly curved, the convex side of the curvature being directed toward the wiper blade.

7. A wiper blade according to claim 1, characterized in that the wiping element has a bottom edge and with the exception of the configuration of the bottom edge, the air deflecting device has substantially the same configuration as the wiping element.

8. A wiper blade according to claim 1, characterized in that the air deflecting device extends in front of and substantially parallel to the wiping element.

9. A wiper blade according to claim 8, characterized in that the ratio between (a) the distance (d1) between the air deflecting device and the wiping element and (b) the distance (d2) between the lower edge of the air deflecting device and the surface to be wiped is substantially equal to ten.

10. A wiper blade according to claim 8, characterized in that the two stops are made of an elastic material.

11. A wiper blade according to claim 4, characterized in that the air deflecting device, said resilient means and said resilient claws are made of an appropriate plastic material.

12. A wiper blade according to claim 7 characterized in that the air deflecting device has a bottom edge and first and second spaced abutments are provided on the bottom edge, said abutments engageable with the surface to be wiped to guide the deflecting device along the surface.

13. A wiper blade comprising a wiping element, at least one air deflecting device and a superstructure characterized in that the air deflecting device has an elongate edge, first and second spaced abutments are provided on the elongate edge and means secure the air deflecting device to the superstructure so that the abutments can bear on a surface to be wiped and transmit substantially the entire force from the deflecting device to the surface, said abutment effectively guiding the deflecting device over the surface without binding with the surface.

14. A wiper blade according to claim 13, characterized in that the means securing the air deflecting device to the superstructure at least partially comprises a resilient material so that multi-dimensional movement of the deflecting device relative to the superstructure is permitted to facilitate conforming of the deflecting device to the surface to be wiped to maintain the abutments in contact with the surface.

* * * * *